United States Patent
Appleby et al.

(10) Patent No.: US 10,220,860 B2
(45) Date of Patent: Mar. 5, 2019

(54) WAYSIDE FRICTION MANAGEMENT SYSTEM

(71) Applicants: L.B. Foster Rail Technologies, Inc., Pittsburgh, PA (US); Harold DeVillo Harrison, Friday Harbor, WA (US)

(72) Inventors: Glen Appleby, Saint-Lazare (CA); James Gavin Campbell, Dublin, OH (US); Donald Thomas Eadie, Mayne Island (CA); Petar Nedkov Gueorguiev, Montreal (CA); Michael Irwin Handler, Dublin, OH (US); Harold DeVillo Harrison, Friday Harbor, WA (US); Kevin David Oldknow, North Vancouver (CA); Steven David Singleton, Sarver, PA (US); Jacob Matthew Welch, Worthington, OH (US); Walter Eric Spicker, Columbus, OH (US); William T. Urmson, Valencia, PA (US)

(73) Assignee: L.B. Foster Rail Technologies, Inc., Pittsburgh, PA (US)

(*) Notice: Subject to any disclaimer, the term of this patent is extended or adjusted under 35 U.S.C. 154(b) by 101 days.

(21) Appl. No.: 15/155,309

(22) Filed: May 16, 2016

(65) Prior Publication Data

US 2016/0257319 A1    Sep. 8, 2016

Related U.S. Application Data

(62) Division of application No. 13/698,865, filed as application No. PCT/CA2011/000595 on May 19, 2011, now Pat. No. 9,352,761.

(Continued)

(51) Int. Cl.
  B61K 9/08  (2006.01)
  B61K 3/00  (2006.01)
  G01L 5/16  (2006.01)

(52) U.S. Cl.
  CPC ............ B61K 9/08 (2013.01); B61K 3/00 (2013.01); G01L 5/16 (2013.01)

(58) Field of Classification Search
  CPC ............ B61K 9/08; B61K 3/00; G01L 5/16
  See application file for complete search history.

(56) References Cited

U.S. PATENT DOCUMENTS 4,245,719 A * 1/1981 Frank .................. B61K 3/00
                                                        184/3.1
4,346,785 A * 8/1982 Frank .................. B61K 3/00
                                                        184/3.1
(Continued)

FOREIGN PATENT DOCUMENTS

CA    2321507 A1    3/2002
EP    1357175 A1    10/2003
(Continued)

OTHER PUBLICATIONS

International Search Report for application No. PCT/CA201/000595 dated Aug. 29, 2011.
(Continued)

*Primary Examiner* — Michael A Riegelman
(74) *Attorney, Agent, or Firm* — Honigman LLP

(57) ABSTRACT

A wayside friction management system, and method for monitoring and controlling a wayside friction management system is described. The system comprises one or more wayside device for mounting with a track of a rail system. The wayside device comprises a delivery system connected to a reservoir comprising a friction control media, the delivery system for applying the friction control media from the reservoir to one or both rails of a track. The wayside (Continued)

device further comprises one or more data collection module located at or adjacent to the delivery system. The data collection module for collecting and transmitting data to a remote performance unit. The data may comprise performance information, track status information, information of an environment of the track, information of a train passing over the track, status of the one or more wayside device, or a combination thereof. The wayside device may comprise a power source operatively connected to one or more components of the wayside device.

10 Claims, 15 Drawing Sheets

Related U.S. Application Data

(60) Provisional application No. 61/395,935, filed on May 19, 2010.

(56) References Cited

U.S. PATENT DOCUMENTS

| | | | | |
|---|---|---|---|---|
| 4,726,448 | A * | 2/1988 | Schroeder | B60R 17/02 184/3.2 |
| 4,856,617 | A * | 8/1989 | Lounsberry, III | B61K 3/00 184/3.1 |
| 5,394,958 | A * | 3/1995 | Junk | B61K 3/00 104/279 |
| 5,492,642 | A * | 2/1996 | Mulvihill | C10M 173/02 508/579 |
| 5,641,037 | A * | 6/1997 | Wise | B61K 3/00 104/279 |
| 5,718,269 | A | 2/1998 | McGarvey | |
| 5,956,664 | A | 9/1999 | Bryan | |
| 6,135,767 | A * | 10/2000 | Kesling | A61C 7/00 433/21 |
| 6,170,594 | B1 * | 1/2001 | Gilbert | B60R 16/0233 180/282 |
| 6,381,521 | B1 | 4/2002 | Dembosky et al. | |
| 6,387,854 | B1 * | 5/2002 | Sedelmeier | C10M 169/02 508/579 |
| 6,446,754 | B1 * | 9/2002 | Kostelny-Vogts | B61K 3/00 184/3.1 |
| 6,464,039 | B1 * | 10/2002 | Urmson | B61K 3/00 184/3.1 |
| 6,592,051 | B1 * | 7/2003 | Natsu | F16N 7/32 239/124 |
| 6,622,824 | B2 * | 9/2003 | Roehrborn | F16N 7/38 184/6.1 |
| 6,719,095 | B2 | 4/2004 | Arens et al. | |
| D495,974 | S * | 9/2004 | Papazoglou | D12/49 |
| 6,795,372 | B2 * | 9/2004 | Kim | G11C 7/065 365/194 |
| 6,854,563 | B2 | 2/2005 | Kumar et al. | |
| 6,991,065 | B2 | 1/2006 | Leslie et al. | |
| 7,096,997 | B2 | 8/2006 | Appleby et al. | |
| 7,100,742 | B2 | 9/2006 | Gunacker et al. | |
| 7,121,383 | B2 | 10/2006 | Kumar et al. | |
| 7,164,975 | B2 | 1/2007 | Bidaud | |
| 7,244,695 | B2 | 7/2007 | Eadie | |
| 7,357,427 | B2 * | 4/2008 | Eadie | B61K 3/02 184/3.2 |
| 7,377,002 | B2 | 5/2008 | Yudovsky et al. | |
| 7,381,907 | B1 | 6/2008 | Frusco | |
| 7,735,697 | B2 | 6/2010 | Nordstrom | |
| 7,784,840 | B2 | 8/2010 | Leslie | |
| 8,180,590 | B2 * | 5/2012 | Szwilski | B61K 9/08 702/150 |
| 8,264,330 | B2 * | 9/2012 | Yeldell | B61L 3/221 246/120 |
| 8,452,467 | B2 | 5/2013 | Kumar | |
| 8,473,128 | B2 * | 6/2013 | Oldknow | B61K 9/08 105/199.2 |
| 2002/0056592 | A1 * | 5/2002 | Arens | B61K 3/00 184/3.1 |
| 2003/0102188 | A1 * | 6/2003 | Gunacker | B61K 3/00 184/3.1 |
| 2003/0111295 | A1 * | 6/2003 | Kumar | B61K 3/00 184/3.1 |
| 2003/0195123 | A1 * | 10/2003 | Cotter | B61K 3/00 508/143 |
| 2004/0011593 | A1 * | 1/2004 | Appleby | B61K 3/00 184/3.1 |
| 2004/0031647 | A1 * | 2/2004 | Leslie | B61K 3/00 184/3.1 |
| 2004/0038831 | A1 * | 2/2004 | Eadie | B61K 3/00 508/110 |
| 2004/0122569 | A1 * | 6/2004 | Bidaud | B61K 9/08 701/19 |
| 2006/0163004 | A1 * | 7/2006 | Kumar | B61K 3/00 184/3.1 |
| 2008/0203735 | A1 * | 8/2008 | Leslie | B61K 3/00 291/3 |
| 2009/0000870 | A1 * | 1/2009 | Holland | B61K 3/00 184/3.1 |
| 2009/0001226 | A1 * | 1/2009 | Haygood | B61K 9/00 246/169 S |
| 2010/0224449 | A1 | 9/2010 | Singleton et al. | |
| 2012/0150370 | A1 * | 6/2012 | Oldknow | B61K 3/00 701/19 |
| 2012/0274772 | A1 * | 11/2012 | Fosburgh | B61K 9/08 348/149 |
| 2013/0233649 | A1 | 9/2013 | Appleby et al. | |
| 2014/0142791 | A1 * | 5/2014 | Boehni | B61K 3/00 701/19 |

FOREIGN PATENT DOCUMENTS

| | | |
|---|---|---|
| EP | 1418222 A2 | 5/2004 |
| GB | 2405910 A | 3/2005 |
| GB | 2405910 B | 4/2006 |
| WO | WO-9813445 A1 | 4/1998 |
| WO | WO-2001018682 A2 | 3/2001 |
| WO | WO-0226919 A2 | 4/2002 |
| WO | WO-200226919 A2 | 4/2002 |
| WO | WO-03099449 A1 | 12/2003 |
| WO | WO-03106240 A1 | 12/2003 |
| WO | WO-2004096960 A1 | 11/2004 |
| WO | WO-2006000094 A1 | 1/2006 |
| WO | WO-2011143765 A1 | 11/2011 |

OTHER PUBLICATIONS

International Search Report for application No. PCT/CA2012/001040.
Office Action for U.S. Appl. No. 13/293,805 dated Sep. 27, 2012.
Cotter, J., et. al. Top of Rail Friction Control: Reductions in Fuel and Greenhouse Gas Emissions, Proceedings of the IHHA Conference, Rio de Janeiro, Brazil, Jun. 2005, 7pp.
Eadie, D., et. al., Implementation of Wayside Top of Rail Friction Control on North American Heavy Haul Freight Railways, Proceedings of the World Congress on Railway Research, Montreal, Quebec, Jun. 2006, 10pp.
Eadie, D., et. al. The Effects of Top of Rail Friction Modifier on Wear and Rolling Contact Fatigue: Full Scale Rail-Wheel Test Rig Evaluation, Analysis and Modelling, 7th International Conference on Contact Mechanics and Wear of Rail/Wheel Systems (CM2006), Brisbane, Australia, Sep. 24-26, 2006, 9pp.
McGuire B et. al. Using Wayside Load Detectors for Preventive Vehicle maintenance, Interface, The J. of Wheel/Rail Interaction, Apr. 2007.
Reiff, R., 2007, Top of Rail Friction Control on Rail Surface Performance and Grinding, TTCI Technology Digest TD-07-039, Nov. 2007, 4pp.
Reiff, R., Mobile-based Car Mounted Top of Rail Friction Control Application Issues—Effectiveness and Deployment, TTCI Technology Digest TD-08-039, Oct. 2008, 4pp.

(56) References Cited

OTHER PUBLICATIONS

Roney, M., et al. Implementation of Distributed Power and Friction Control to Minimize the Stress State and Maximize Velocity in Canadian Pacific's Heavy Haul/Heavy Grade Train operations. 2010, Journal of Rail and Rapid Transit, 224:F5, pp. 465-471.
Notice of Allowance dated May 3, 2013 for U.S. Appl. No. 13/293,805.
International Search Report for PCT/CA2011/000595 dated Aug. 29, 2011.
International Search Report for PCT/CA2012/001040 dated Feb. 14, 2013.
Office Action dated Sep. 27, 2012 for U.S. Appl. No. 13/293,805.
Eadie, D., et al. The Effects of Top of Rail Friction Modifier on Wear and Rolling Contact Fatigue: Full Scale Rail-Wheel Test Rig Evaluation, Analysis and Modeling, 7th International Conference on Contact Mechanics and Wear of Rail/Wheel Systems (CM2006), Brisbane, Australia, Sep. 24-26, 2006, 9pp.
McGuire, B., et al. Using Wayside Load Detectors for Preventive Vehicle Maintenance. Interface, The J. of Wheel/Rail Interaction, Apr. 2007, 14pp.
Office Action dated Dec. 10, 2013 re AU Application 2011256101.
Examination Report dated Feb. 18, 2014 re AU Application 2011256101.
Examination Report dated Mar. 17, 2015 re AU Application No. 2011256101.
Office Action for U.S. Appl. No. 13/698,865 dated Aug. 24, 2015.
Notice of Allowance for Canadian Application No. 2,794,874 dated Mar. 2, 2017.
Office Action for U.S. Appl. No. 14/750,909 dated Jul. 31, 2017.
Exam Report regarding Australian Application 2012334761 dated Apr. 6, 2016.
Notice of Acceptance regarding Australian Application 2012334761 dated Jun. 23, 2016.
Office Action regarding Canadian Application 2,794,874 dated Sep. 22, 2016.
Exam Report regarding Australian Application 2015252161 dated Jul. 1, 2016.
Final Office Action for U.S. Appl. No. 14/750,909 dated Jan. 12. 2018.
International Search Report for Application PCT/CA2017/051351 dated Feb. 12, 2018.

\* cited by examiner

WAYSIDE FRICTION MANAGEMENT SYSTEM

CROSS-REFERENCE TO RELATED APPLICATIONS

This Application is a Division of application Ser. No. 13/698,865 filed on May 28, 2013 which claims priority under 35 U.S.C. § 120 and 365(c) from PCT Patent Application PCT/CA2011/000595 filed May 19, 2011, which claims priority to U.S. Provisional Application 61/395,935 filed May 19, 2010.

FIELD OF INVENTION

The present invention relates to a wayside friction management system. The present invention also relates to the use of sensor feedback and performance analysis for control and adjustment of wayside friction management systems in rail operations.

BACKGROUND OF THE INVENTION

It is well known that wayside friction management application systems, including gage face (GF) lubrication systems and top of rail (TOR) friction modifier application systems are used to impart a number of benefits in railroad operations including reductions in lateral (track spreading) loads or curving forces, derailment probability, rail and wheel wear, energy (fuel) consumption, initiation and propagation of rolling contact fatigue, noise and corrugations.

Top of Rail friction modifier application systems, specifically, impart benefits in the areas listed above through control of friction at the TOR/wheel tread interface. TOR friction modifier materials, commonly used for this purpose, are water based liquids that establish a dry thin film at the wheel/rail interface once the water has been ejected.

Due to the nature of the materials of used in TOR friction control, direct detection of their presence at the wheel/rail interface can be difficult. Measurement and analysis of Lateral and Vertical forces in curves, and the ratio between the two (LN) represents one of the most direct and immediate means to verify TOR friction control effectiveness. In practical settings, however, there are a substantial number of factors in addition to TOR friction control that can lead to a change in lateral/vertical forces at a given location, including changes in wheel/rail profiles (for example due to maintenance grinding or reprofiling operations), changes in the state of gage face lubrication, as well as intentional changes in the state of gage face and/or TOR lubricator states for the provision of maintenance activities. Due to changes in track conditions in areas that are subjected to increased wear and lateral forces, for example curves or regions with changes in elevation, control of a given wayside friction control application system based on one-off local measurements is insufficient for fully effective management of friction over a given territory.

U.S. Pat. No. 6,446,754 teaches the application of a lubricant to a track within a rail yard. The determination as to whether or not lubricant is to be applied is based on the speed of a rail car within the rail yard. U.S. Pat. No. 6,991,065 describes the application of lubricant to a track based on data received from vibration, sound or L/V sensors located at a target section of track. The determination as to whether lubricant is to be applied to the track is made while the train passes though the target section of track.

SUMMARY OF THE INVENTION

The present invention relates to a wayside friction management system. The present invention also relates to the use of sensor feedback and performance analysis for control and adjustment of wayside friction management systems in rail operations.

It is an object of the invention to provide an improved wayside friction management system.

The present invention includes methods, an apparatus and a system for a high level, automatic control of friction management application systems over a given territory. Local measurements of lateral/vertical forces are carried out using self-contained measurement modules capable of transmission of results to one or more locations through communications methods using, for example, wireless transmission, radio frequency (RF) transmission or by wire/cable. Data from the lateral/vertical force measurement modules is collected and stored in remote performance monitoring database and analysis system. The analysis system comprises algorithms to compare lateral/vertical force statistics versus establish threshold values as well as detect changes and/or trends in force values.

The friction management application systems are also equipped with sensing and control systems capable of transmitting performance and operational data and statistics to one or more locations via communications methods using, for example, RF and/or cellular data transmissions. Data from the friction management application systems is also collected and stored in the remote performance monitoring database, providing a record of applicator system status and performance in the given territory. In addition, known maintenance conditions in the territory are communicated and stored in the remote performance monitoring database.

As noted above, the remote performance monitoring database is hosted on a computing system (e.g. server) with resident algorithms to process lateral/vertical force values, changes and trends relative to threshold and baseline values. These results and trends are evaluated in conjunction with status and performance data collected from friction management application systems, as well as maintenance information from the territory. By assimilating the results from multiple measurement sites and evaluating in the context of known maintenance conditions, it is possible to determine the most probable cause of a change in lateral/vertical force levels. The application settings/output rates of one or more friction management application systems can then be adjusted based on a high level understanding of territory-wide performance.

In addition to the manipulations of output rates of application of wayside compositions, automatic adjustment can include remote on/off control, as well as directional control of application to facilitate different application rates of wayside compositions for each direction of passing traffic.

In addition to lateral/vertical force feedback, the additional information sources, for example, weather monitoring, video capture, photo capture, acoustic feedback, vibration feedback, temperature feedback, speed feedback or a combination thereof, may be captured and transmitted to the remote performance monitoring database for evaluation and potential manipulation of friction management application system settings. For example, weather monitoring allows for adjustments to the wayside friction management application systems based on the influences of temperature, precipitation and other environmental factors on wayside friction management application system effectiveness. Video and/or photo capturing, may be used to evaluate system status and performance (e.g. image analysis of friction control application effectiveness), as well as potential damage to wayside systems. Acoustic feedback, provides for the detection of friction management system performance levels through identification of wheel squeal and flanging noise, as well as general wheel/rail interaction noise. Vibration feedback, allows for the detection of friction management system performance through the mechanical transmission of energy (e.g. due to rail and/or wheel roughness) and corresponding adjustment. Temperature feedback, may be used for adjustments based on the influences of rail temperature, product reservoir temperature, ambient temperatures and other temperature measurements. Speed feedback, allows for the characterization of speed distributions at the measurement site, evaluation of impacts on friction control effectiveness and corresponding adjustments.

According to the present invention there is provided a wayside friction management system for application of a friction control media to a surface of a track of a rail system, comprising one or more than one wayside device for mounting on the track, a power source operatively connected to the wayside device, an applicator connected to the wayside device and configured for fluid communication with a reservoir comprising the friction control media, the applicator for applying the friction control media from the reservoir to the surface of the track, and one or more than one data collection module located at or adjacent to the one or more than one wayside device, the one or more data collection module for collecting and transmitting data for example, by radio frequency, cellular communications channels, or both, to a remote performance monitoring unit, the data comprising performance information, track status information, information of an environment of the track, information of a train, or a combination thereof. The remote performance monitoring unit may comprises a database for storing the transmitted data.

The present invention also provides the wayside friction management system described above, comprising a plurality of the one or more wayside device distributed over a designated geographical territory, the remote performance unit receiving the data from each of the one or more data collection modules distributed within the designated geographical territory. Furthermore, the wayside friction management system may comprise a plurality of the designated geographical territories, each of the designated geographical territory comprising a plurality of the one or more wayside device.

The present invention also provides the wayside friction management system described above, wherein the one or more data collection module comprises one or more unit for collecting one or more lateral/vertical force, measurements, incoming vertical load data, locomotive position data, or a combination thereof. The one or more data collection module may further comprises one or more units for measuring temperature, precipitation, wind, a video unit, a photo capture unit, an acoustic feedback unit, a vibration detection unit, a strain gauge, an accelerometer, a speed detection unit feedback or a combination thereof.

The wayside friction management system as described above, may also comprises a receiver for receiving instructions from the remote performance monitoring unit, the receiver in operative association with the applicator so that when the applicator is in fluid communication with the friction control media, application of the friction control media to the surface of the track may be controlled by the remote performance unit.

The present invention also provides a remote performance monitoring database and system, which collects and stores the transmitted data of received from the one or more data collection module as described above. The remote performance monitoring database and system may store information regarding status of maintenance activities in a given territory. The remote performance monitoring database and system may also further comprising one or more software algorithms for analyzing the transmitted data, and provides an output of track performance, track status, information of an environment of the track, information of a train, or a combination thereof. The transmitted data may include one or more measurement of lateral/vertical force, incoming vertical load, locomotive position, temperature, precipitation, wind, vibration, train speed, a video, a photograph, a sound recording, automatic equipment identification, or a combination thereof.

The present invention pertains to the remote performance monitoring database and system described above and further comprising a transmitter to convey instructions by radio frequency, cellular communication channels, or both, to a receiver in communication with the one or more wayside device.

The present invention also provides a method of monitoring a wayside friction management system comprising, collecting data measured at one or more lateral/vertical force measurement location, transmitting the data by radio frequency, cellular communications channels, or both to a remote performance monitoring unit, and comparing the data with base line reference values stored on a database of the remote performance monitoring unit, recent values obtained from the same one or more wayside module, stored on a database of the remote performance monitoring unit, or both. The lateral/vertical force measurement location may be located, or may not be located, at the same place as one or more than one wayside device.

The data measured at each of the one or more lateral/vertical force measurement location in the method as described above, may pertain to performance information of the track, information of the train, status information of the track, an environment of the track, or a combination thereof. The data measured may be obtained from one or more lateral/vertical force measurement modules, and the data compared with baseline values of lateral forces, lateral/vertical force ratios, recent values from the wayside device, or a combination thereof. Furthermore, the data measured may include incoming vertical load and locomotive position data, and the data analyzed to identify and categorize train type, loaded/empty status of the train to ensure that the data compared is obtained from like-traffic. The data measured may further comprises temperature, precipitation, wind, sound, vibration, speed, video image, photographic image, or a combination thereof. Additionally, the data measured may be automatic equipment identification (AEI) data, and the AEI data is compared with the lateral/vertical force records stored in the remote performance monitoring database to produce results, and using the results to identify specific traffic types by code.

If the data measured using the method as described above, is speed data, the data may be filtered to exclude data from trains operating at speeds significantly below or above the normal distribution of speeds at each lateral/vertical force measurement location.

The present invention also pertains to the method described above wherein the a wayside friction management system comprises one or more than one wayside device, and the data measured from one or more data collection module is compared with the base line reference values stored on a database of the remote performance unit, the base line reference values comprising track maintenance condition, intentional system shutdown conditions due to known track maintenance work, track grinding, tie removal, tie replacement, or a combination thereof, to determine whether an adjustment of an applicator system of the one or more wayside device is needed to restore target lateral force levels. The method may further comprise a step of determining when there is a change in the data, and as required transmitting changes in friction control system application settings to the one or more wayside device.

The present invention also provides the method described above, wherein an increase in a L/V ratio, or an average lateral axle force measurement obtained at the lateral/vertical force measurement location, when compared to a value predetermined at the lateral/vertical force measurement location, results in a change of a setting transmitted to the one or more wayside device to increase friction control media application to a track. Alternatively, no change of the L/V ratio, or average lateral axel force measurement obtained at the lateral/vertical force measurement location, when compared to a threshold value predetermined at the lateral/vertical force measurement location, results in no change to a setting of friction control media application transmitted to the one or more wayside device.

The present invention also provides the method described above, wherein the a wayside friction management system comprises one or more wayside device, the data measured from one or more lateral/vertical force measurement modules is compared with lateral/vertical force measurement patterns with known maintenance conditions, intentional system shutdown conditions due to known track maintenance work, or a combination thereof, to determine whether an adjustment of an applicator system of the one or more wayside device is needed to restore target lateral force levels. Furthermore, changes in friction control system application settings may be transmitted to the wayside friction management systems.

The present invention provides methods to identify the need, and monitor the effect, of friction and lubricant compositions used in TOR friction control at the wheel/rail interface. The method provided herein also monitors changes in the state of gage face lubrication, as well as intentional changes in the state of gage face and/or TOR lubricator states for the provision of maintenance activities.

An advantage provided by the system and methods and system of the present invention is that they provide an immediate assessment of performance in a given location through measurement of for example but not limited to, lateral/vertical curving forces. This leads to rapid assessment of performance and control of friction modifier or lubricant application to ensure that target benefits, including reducing lateral (track spreading) loads, reducing curving forces, reducing probability of derailment, reducing rail and wheel wear, reducing energy consumption, reducing fuel consumption, reducing initiation and propagation of rolling contact fatigue, reducing noise and reducing corrugations, are achieved. Furthermore, the assessment of one or more locations within a designated geographical territory, or a plurality of geographical territories may be monitored, analyzed, and as required, the application rate of friction control media at one or more identified wayside devices within the one or more locations, adjusted accordingly.

Furthermore, the data communication modules of the present invention, comprising sensors, transmitters and receivers and operatively associated with a wayside device, as described herein, are of a compact size. This permits mounting of the module directly to a rail of a rail system in key locations with a territory to be monitored. The data communication modules are also cost effective to produce and therefore, multiple modules may be deployed territory wide in a cost effective manner. The use of a plurality of data communication modules operatively associated with wayside devices, and a remote performance monitoring system, permits monitoring of track conditions, trains and the way side device, and provides an effective way to control the delivery of friction control media from a wayside device to the track.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 1 shows a block diagrams representation of the flow of information and control actions in determining system performance and territory conditions, and adjusting outputs, in accordance with an embodiment of the present invention.

FIG. 6 shows examples of the relationship between the application of friction control and lateral/vertical force measurements.

DETAILED DESCRIPTION

The present invention relates to a wayside friction management system. The present invention also relates to the use of sensor feedback and performance analysis for control and adjustment of wayside friction management systems in rail operations.

The following description is of a preferred embodiment.

Figure 1A:
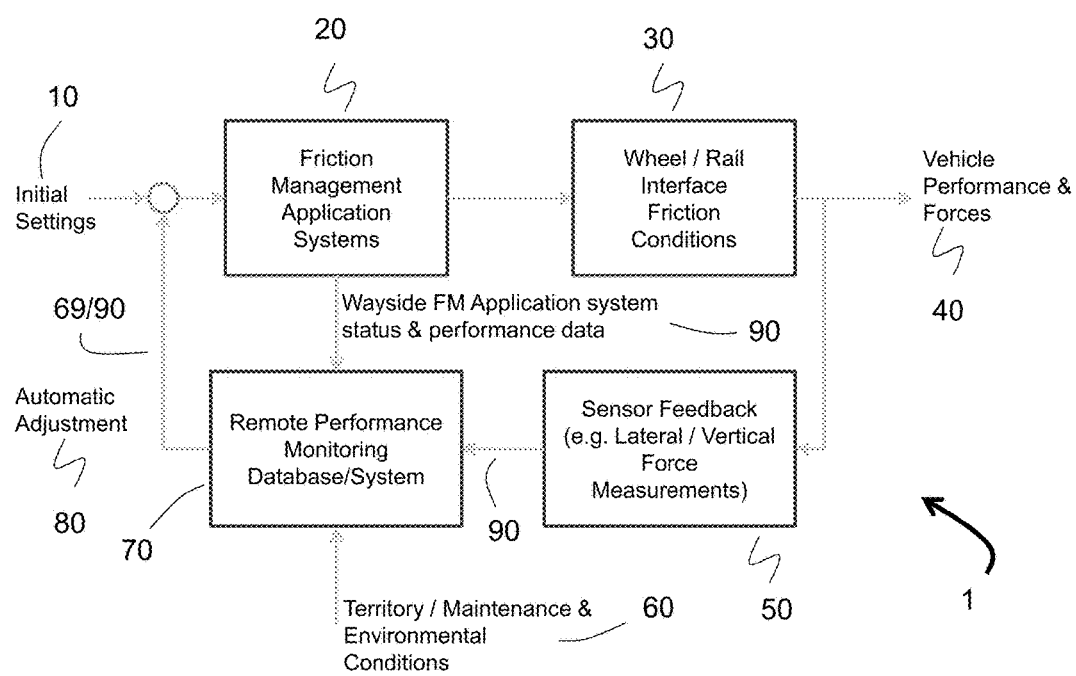
FIG. 1A shows the overall information flow of the wayside friction management system (1) of the present invention.

The present invention provides a wayside friction management system 1, as generally shown in FIG. 1A. The system comprises one or more than one wayside device 22 (see FIG. 1B) mounted alongside a track 12 of a rail system and for application of a friction control media to the track and for obtaining data from the track and the environment of the track. Each wayside device comprises a delivery system 24 connected to a reservoir 26 comprising the friction control media via hoses 21 A pump 28 may be located at the reservoir 26, or between the reservoir and the delivery system 24. The delivery system 24 is located adjacent a track 12 to be treated so that the friction control media may be applied to one or both rails of the track 12.

The friction control media may be directly applied to a gauge face 16, top of rail 14, or both, as a paste, a liquid, picked up by direct contact with passing wheels, or it may be sprayed onto the gauge face 16, top of rail 14, or both, of the track 12, or onto the flanges or treads of passing wheels. The friction control media may also be introduced to the track surface through holes within the track that are in fluid communication with the delivery system so that the friction control media is provided to the track surface at the gauge face or top of rail.

Wayside devices 22 are usually deployed immediately preceding a location where application is required, the passage of the train wheels tends to move the liquid composition into the area so as to modify the friction on the rail sections and wheel treads and flanges as the train passes. There are several designs of stationary devices, and apparatus for securing them so as to permit the automatic application of an appropriate composition to the rail when a train passes. In some of these devices, it is the depression of the roadbed that triggers the dispensation of a composition; in others, it is the tripping of a mechanical device, such as a lever or a plunger, by the train's wheels that activates a composition dispensing mechanism, or it may be triggered by a wheel sensor device which is based on magnetic activation. A wayside delivery system may be activated mechanically, hydraulically, or electrically. Any type of wayside device may be used with the friction management system described herein. Example of such prior art devices is shown in U.S. Pat. No. 5,641,037 (which is incorporated herein by reference).

Figure 9:
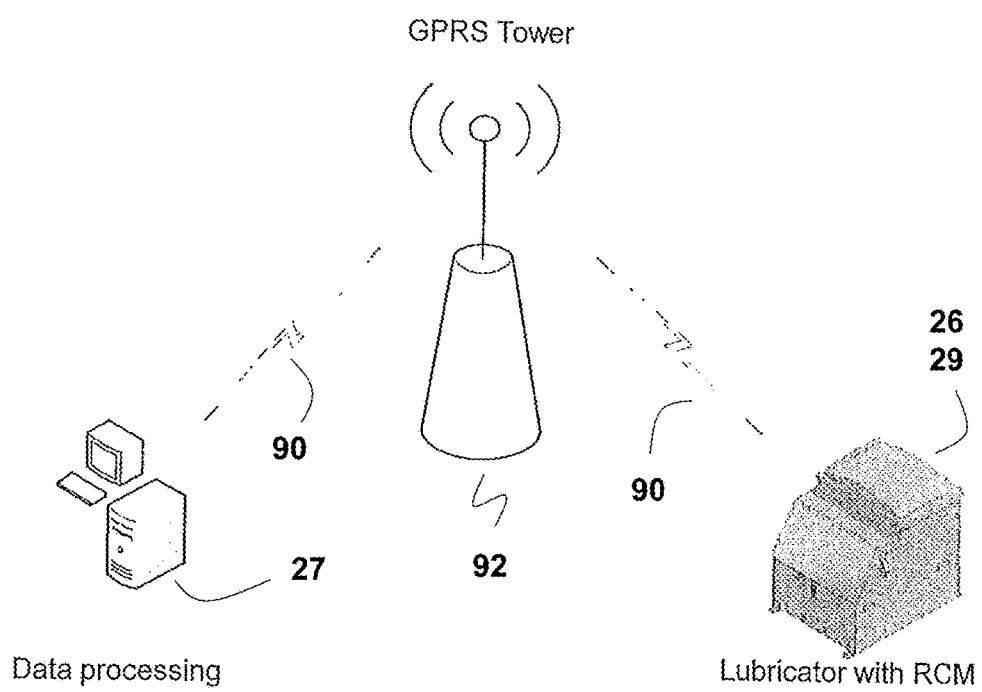
FIG. 9 and FIG. 10 show the cellular and radio frequency communication models (respectively) for transfer of remote performance monitoring data from data communication modules (29) of a wayside device (22) to a remote performance monitoring database (27). The same communication model may apply to data transfer from lateral/vertical force measurement modules and other performance data collection systems database (GPRS: general packet radio service).
Figure 10:
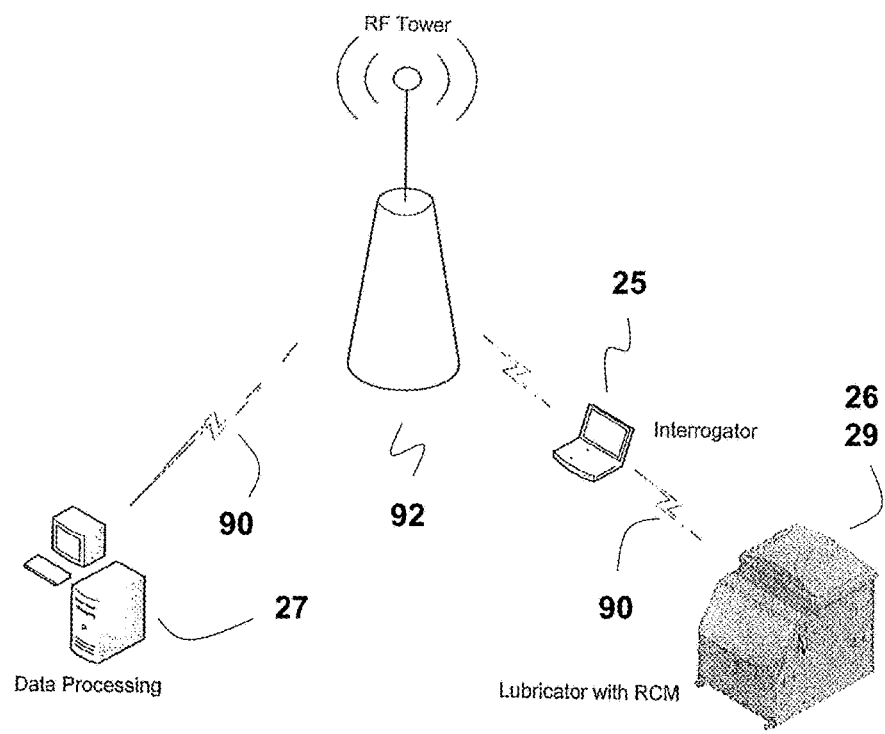

The wayside device further comprises one or more than one data collection module 29 (DCM) located at or adjacent to the delivery system 24. The one or more than one data collection module 29 collects data (for example, but not limited to 69), and transmits the data by wire/cable, or wirelessly, for example but not limited to by radio frequency, cellular communications channels 72, 90, for example but not limited to general packet radio service 92 (GPRS; FIGS. 9 and 10), or both, to a remote performance unit 70 located off-site from where the wayside device is located. The wayside device also may comprise a power source operatively connected to one or more components of the wayside device, for example, the pump 28, the delivery system 24, the data communications module 29, or a combination thereof.

The data collected and transmitted by the one or more data communication modules may comprise performance information and status of the wayside delivery system 90, performance information of the track 50, track status information 60, information of an environment of the track 60, information of a train passing over the track 40, or a combination thereof. For example, which is not to be considered limiting, the data collected by the one or more data collection module 29 may include one or more lateral/vertical force measurements, lateral force measurements, incoming vertical load data, rail lateral or vertical deflection, gauge width, locomotive position data, auto equipment identification, one or more unit for measuring reservoir tank level, pump motor current, delivery hose pressure, delivery hose temperature, battery voltage, ambient temperature, precipitation, wind, a video unit, a photo capture unit, an acoustic feedback unit, a vibration detection unit, a speed detection unit, a strain gauge, an accelerometer, or a combination thereof. Additional sensors may also be used as would be apparent to one of skill in the art.

The wayside friction management system 1 may further comprise a plurality of the one or more friction application systems 20, comprising one or more wayside device 22 (FIG. 1B), distributed over a designated geographical territory. In this manner the remote performance unit 70 receives data from a plurality of one or more data collection modules 29 distributed within the designated geographical territory. Furthermore, the remote performance unit 70 may obtain data from a plurality of the designated geographical territories, each of the designated geographical territory comprising a plurality of the one or more wayside device 22 and data collection modules 29. Therefore, the wayside friction management system 1 may include one or more designated geographical territories, and one or more data sampling locations. For simplicity, the systems described below pertain to one or more wayside device 22 within a friction management application system 20 communicating with a remote performance module 70, but it is to be understood that this is for the purpose of describing the system. The present invention also includes the use of a plurality of friction management application systems located within one or more designated geographical territories.

The present invention also provides a method of monitoring a wayside friction management system. The method involves collecting data measured at one or more than one data collection module 29 located at a lateral/vertical force measurement location. The lateral/vertical force measurement location may be located, or may not be located, at the same place as one or more than one wayside device 22. The measured data is transmitted 90 by radio frequency, cellular communications channels, or both, from the data collection module 29 to a remote performance monitoring unit 70. The data is then compared with base line reference values or initial settings 10, stored on a database of the remote performance monitoring unit 70, recent values obtained from the same one or more than one data collection module 29 at the lateral/vertical force measurement location, stored on a database of the remote performance monitoring unit, or a combination thereof.

The L/V measurement location may be the same as that of a friction application system or site comprising a wayside device, or the L/V measurement location may be located at a distance from the friction application system. If the one or more L/V measurement sites are located at a distance from the friction application site, then the L/V measurement sites may be considered stand-alone measurement locations that communicate with the central remote performance monitoring database 70 via a mobile RF interrogator 25, GPRS 90, radio frequency, cellular communications channels and the like. The L/V data from these stand-alone measurement locations may be evaluated by the RPM system 70 to determine the performance of nearby friction application systems 20, for example one or more wayside devices within a defined region. The area of a defined region would be apparent to one of skill in the art. The size of a defined region may vary depending upon the number of curves, type of curves, variations in grade, amount of straight track, environmental conditions (e.g. temperature range; amount of precipitation; etc), and the like, Based on the analysis performed by the RPM system 70, changes in settings for the one or more than wayside device 22 located at a distance from the L/V/measurement site, but within the defined region, may be transmitted to the one or more wayside devices. With this arrangement, the L/V modules do not communicate via specific friction application systems. Rather, the changes in settings, sent to the one or more wayside device, are transmitted to the wayside device via the RPM system 70. This permits use of data obtained from other, or existing, L/V measurement systems located within the same defined region as that of the friction application system, as an input for the RPM system 70. Therefore, wayside devices located within a defined region may be controlled by the RPM system based on data from existing L/V measurements systems as well.

The data measured at each of the one or more L/V measurement location, may pertain to performance information of the track 30, information of the train 50, status information of the track 60, including maintenance schedule, information about the wayside device, for example, reservoir tank level, pump motor current, pump shaft encoder information, delivery line (hose) pressure, delivery line temperature, battery voltage, an environment of the track 60, including temperature, precipitation, wind, information from one or more sensors 50 including for example, a measurement of lateral/vertical force (lateral dynamic loadings/vertical dynamic loadings); L/V ratio incoming vertical load, locomotive position, vibration, train speed, a video, a photograph, a sound recording, automatic equipment identification (AEI data), or a combination thereof.

The L/V ratio can be used to determine track failure, for example, dynamic gauge widening due to outward movement of one rail under vehicle loading, or wheel climb (flange climb). The L/V ration can be determined using the Nadal formula:

The Nadal formula is represented by:

$$\left(\frac{L}{V}\right) = \left(\frac{\tan(\delta) - \mu}{1 + \mu * \tan(\delta)}\right)$$

L and V refer to the lateral and vertical forces acting upon the rail and wheel, δ is the angle made when the wheel flange is in contact with the rail face, and μ is the coefficient of friction between the wheel and the rail The data for measuring L/V ration, lateral force may be obtained using any instrument suited for this purpose include for example a Wayside Wheel/Rail Load Detector (WRLD), a truck performance detector (TPD; Transportation Technology Center, Inc., Association of American Railroads; McGuire B et. al. Interface, The J. of Wheel/Rail Interaction, April 2007; which is incorporated herein by reference)

If the data measured includes incoming vertical load and locomotive position data, then the data to identify and categorize train type, loaded/empty status of the train, may be used to ensure that the data being compared is obtained from like-traffic. Furthermore, if the data measured is automatic equipment identification (AEI) data, then the AEI data may be compared with the lateral/vertical force records stored in the remote performance database to produce results, and the results may be used to identify specific traffic types by code in order to ensure that data about the track is obtained from like-trains. The data measured may also include speed data, and the measured data may be filtered using the speed data to exclude data from trains operating at speeds significantly below, or above the normal distribution of speed at each lateral/vertical force measurement location, for example data less than 25%, or greater than about 25%, or from about 25-100%, of the normal distribution of speed may be discarded. The measured data may then be analyzed to determine whether an adjustment of a delivery system of the one or more wayside device is required to restore target lateral force levels. If changes in friction control system application settings are determined to be required, then they are transmitted 80 to the one or more wayside device.

The data obtained from one or more data collection module may be compared with the base line reference values (initial settings 10), status information of the track 60, or a combination thereof, stored on a database of the remote performance unit 70. The base line reference values may include track maintenance condition, intentional system shutdown conditions due to known track maintenance work, track grinding, tie removal, tie replacement, or a combination thereof. The base-line reference data may then be factored in to determine whether an adjustment of a delivery system of the one or more wayside device is required to restore target lateral force levels. If changes in friction control system application settings are determined to be required, then they are transmitted 80 to the friction management application system 20 comprising one or more wayside device 22.

Figure 1B:
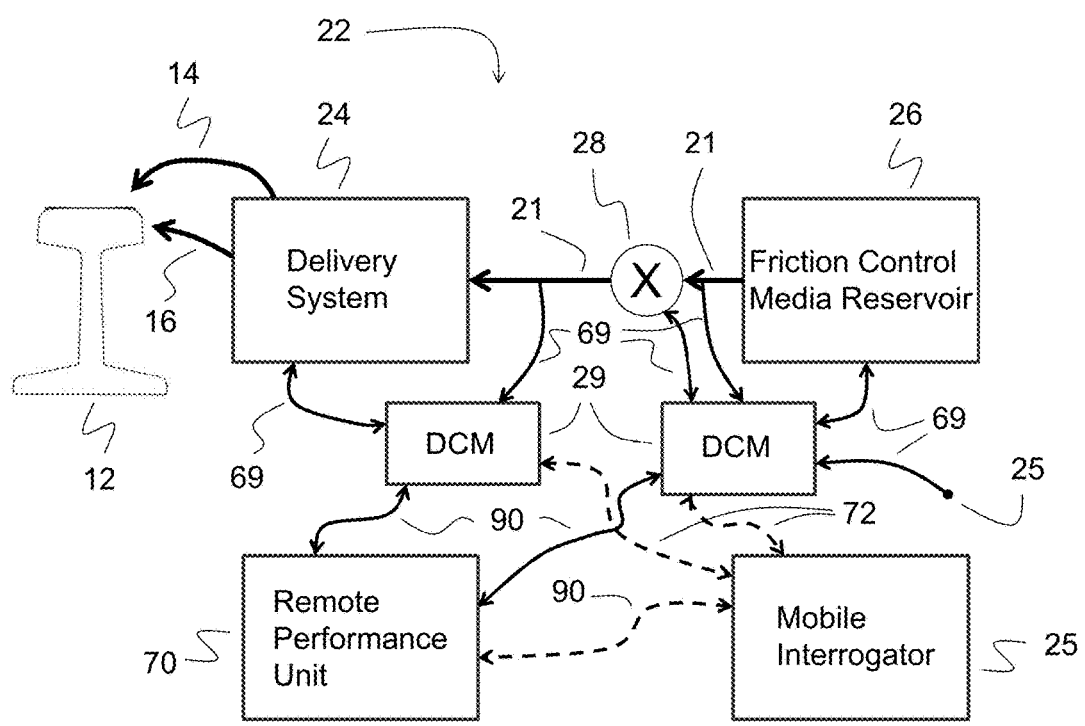
FIG. 1B shows components within one friction management application system (20) of FIG. 1A.
Figure 1C:
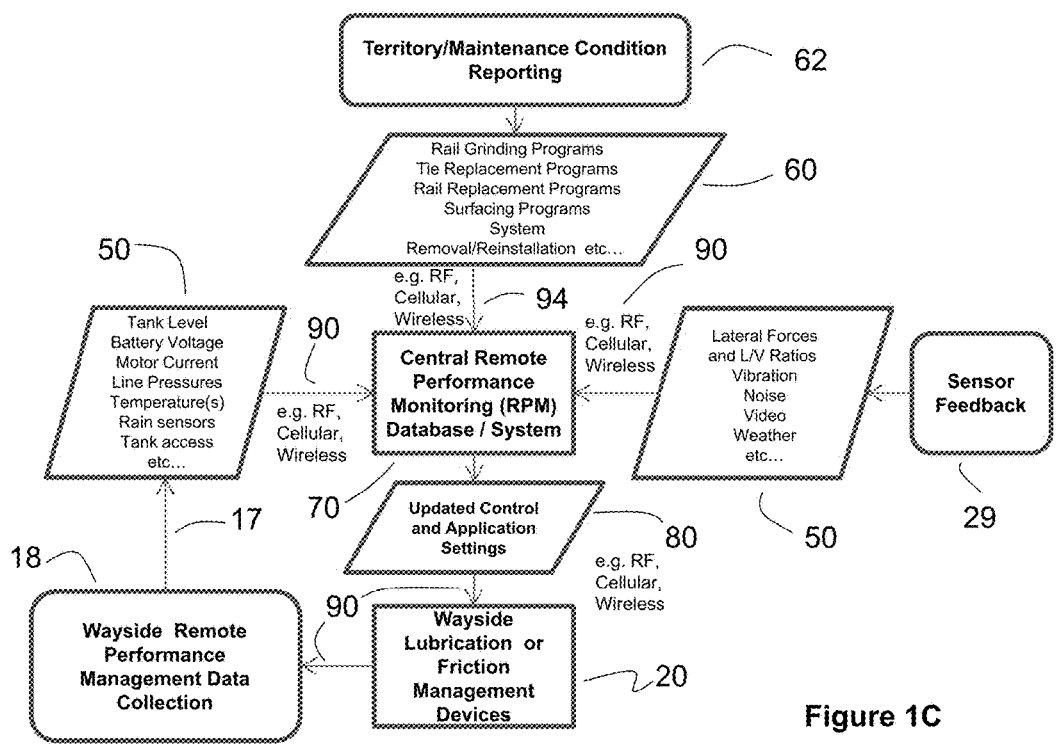
FIG. 1C shows data inputs from territory/maintenance conditions, sensors within data collection modules, and wayside device status, that can be received and analyzed by a remote performance monitoring system.
Figure 1D:
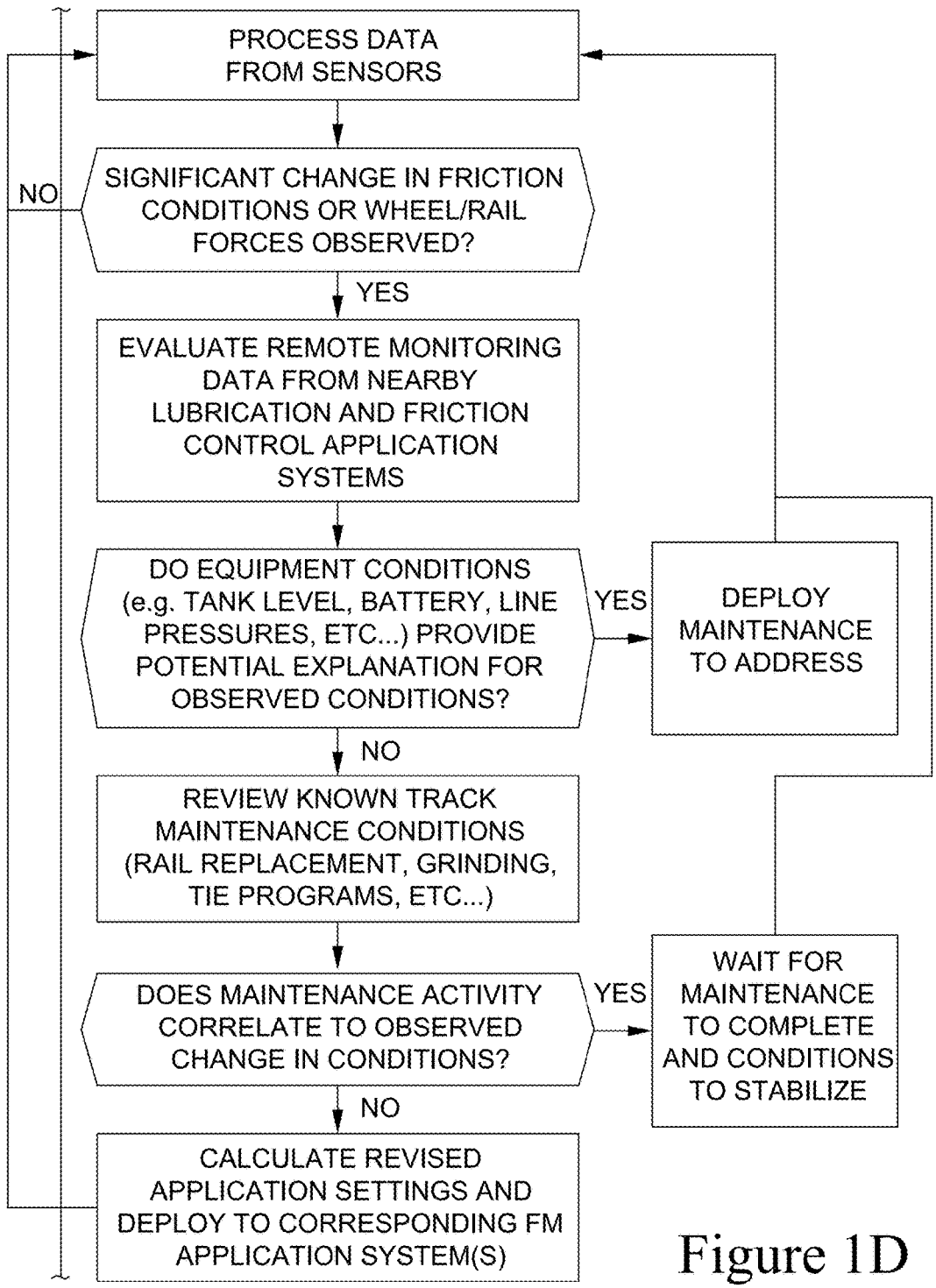
FIG. 1D shows an example of a flow chart outlining how data received by the remote performance monitoring unit may be processed.

FIG. 1C shows data inputs that may be analyzed by the remote performance unit 70 (also referred to as central remote performance monitoring database/system; RPM system). These inputs include: 1) territory maintenance conditions 62, and may for example, include data 60 regarding rail grinding programs, tie replacement programs, rail replacement programs, surfacing programs, system removal/reinstallation and other maintenance procedures that may tack place within a rail system; 2) sensor feedback 29, including for example, data 50 regarding lateral force, L/V ratios, vibration, noise, video, environmental conditions and the like; 3) status of wayside device 18, and may include for example, data 50 regarding reservoir tank level, battery voltage, motor current, line or hose pressure, line or hose temperature and the like. These data are transmitted to the remote RPM system using wireless communications (90, 94), where the data is processed (FIG. 1D; see below). As required, updated control and application settings 80 may be transmitted to the friction management application system 20 comprising one or more than one wayside device 22. Status of the friction management device 20 may be collected, wayside remote performance data 18, and this data may be accessed by the RPM system, along with data regarding the status of the wayside device 26, 50 (e.g. tank level, battery voltage, motor current, line pressures and temperature etc.) for inclusion within the analysis by the RPM system.

A non-limiting example of an outline of the analysis that may take place within a remote performance unit 70 (RPM system) is provided in FIG. 1D. Data received from sensors (e.g. via data communication modules 29) is input. The data is analyzed to determine if there are significant changes in the friction conditions or wheel/rail forces, for example as described below with reference to FIGS. 6A-6C. If there are significant changes in the friction conditions, then data representative of conditions of the friction management application system 20 are evaluated to determine if there are issues with the wayside device or associated components. If required, the wayside device and/or components are serviced. If no maintenance of the wayside device is required, then data track maintenance is analyzed to determine if the track maintenance needs to be completed. Based on these analysis, and as required, revised application settings may be deployed to one or more than one wayside device of the target friction management application system 20. For example, to increase, or decrease, the amount or location (TOR or gauge face) of friction control media to be administered to the track.

Figure 6A:
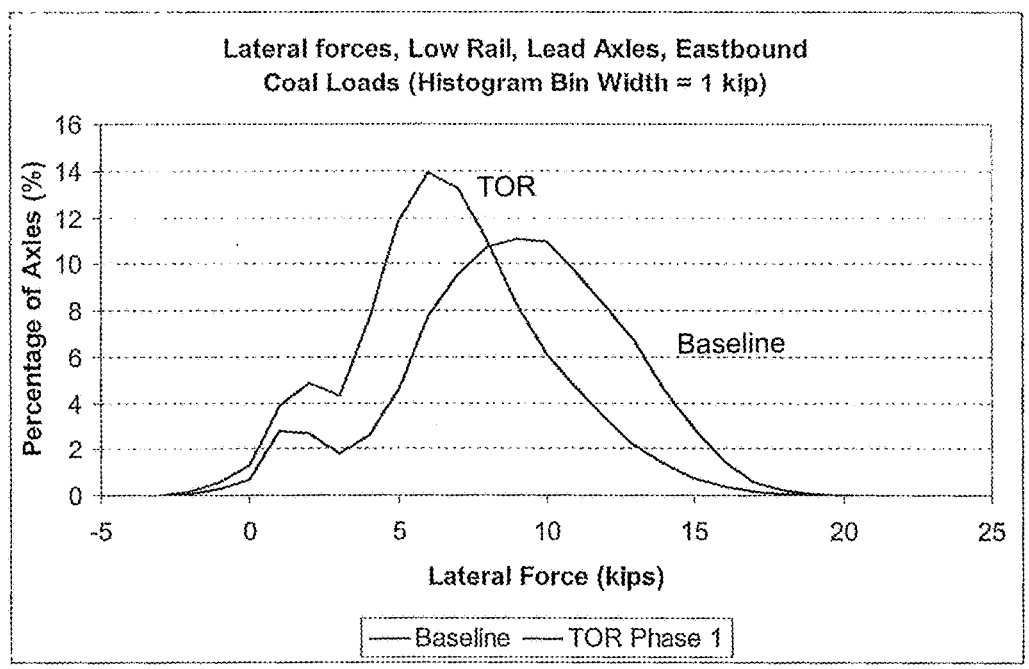
FIG. 6A shows that application of friction control media to the top of rail (TOR) provides effective friction control as observed with a shift in lateral force levels (data obtained using an open track).

The efficacy of applying a of friction control composition to reduced lateral/vertical force is shown in FIG. 6A. Application of friction control compositions to the top of rail (TOR) results in a reduction in lateral/vertical force levels of from about 20 to 75% (for example, a predominate lateral force of about 5.5 kips for 14% of axels) when compared to lateral forces measured without application of friction control compositions (11% of axels observed at a predominant lateral force of about 10 kips). This is also observed when the lateral force is considered at same percentage of axel passes, for example, at 10% the baseline lateral force varies from about 7-11 kips, while with TOR treated track, the lateral force is reduced to about 4-9 kips. This data also shows that the lateral force is reduced from about 20-50% over a most of the percentage of axel passes.

Figure 6B:
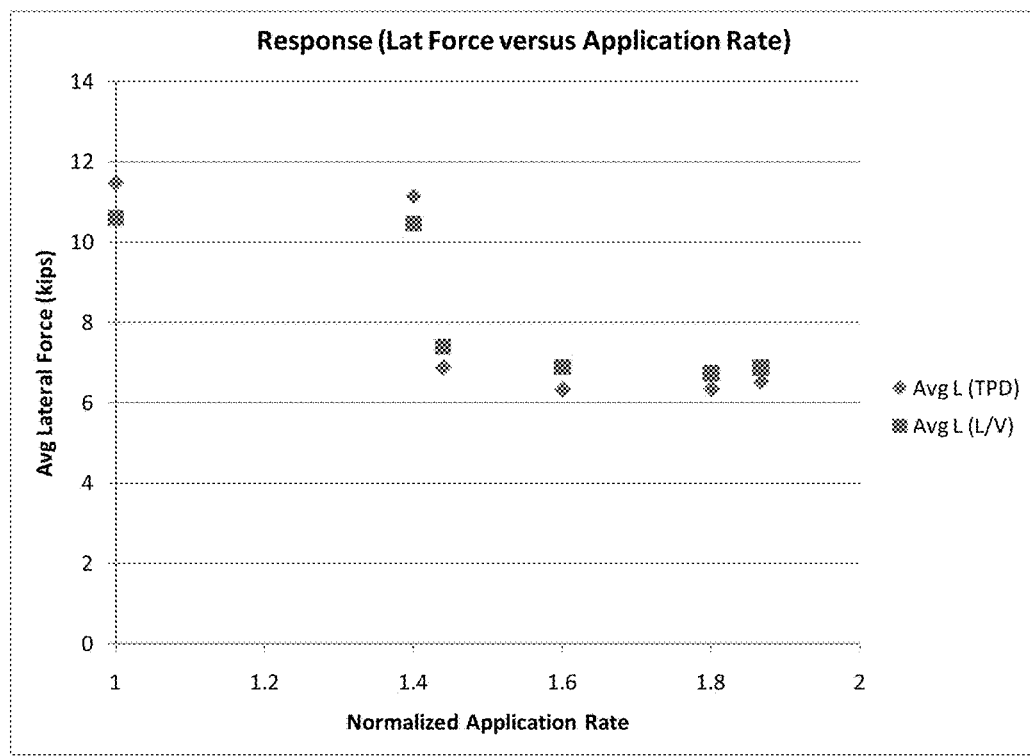
FIG. 6B shows the relationship between average lateral force (kips) and friction control media application rate. Data were obtained using a closed track system. After a steady state was obtained, lateral forces were calculated based on final 5 laps. Data was obtained using lateral force modules as described herein.
Figure 6C:
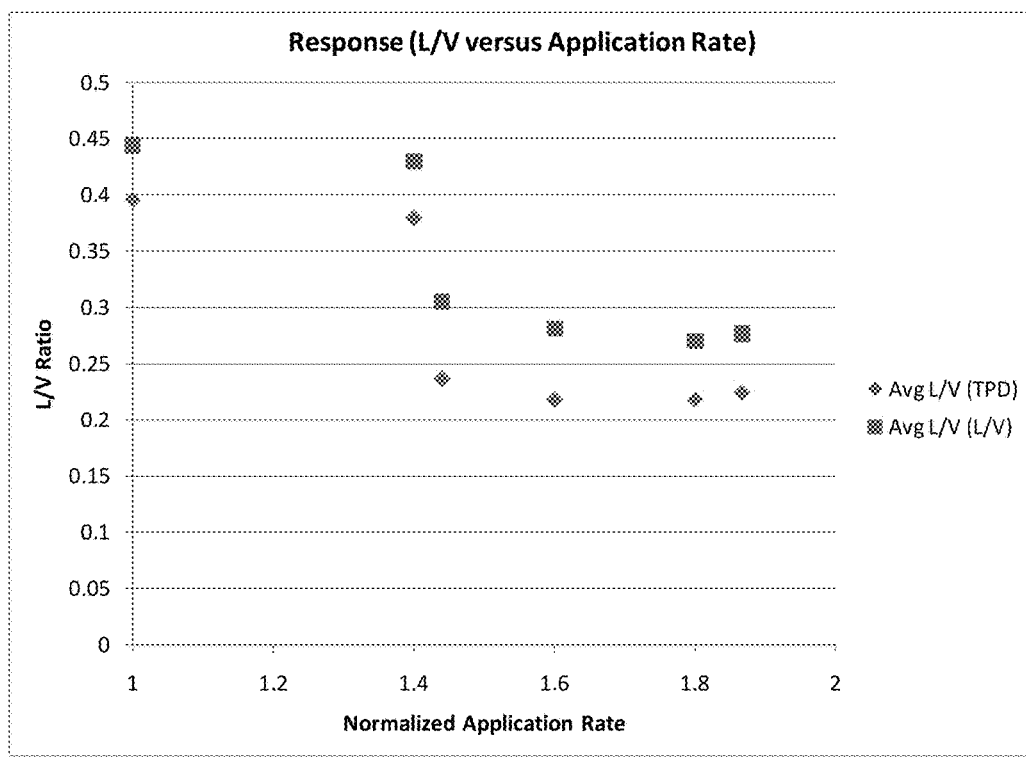
FIG. 6C shows the relationship between L/V ratio and friction control media application rate. Data were obtained using a closed track system. After a steady state was obtained, L/V ratios were calculated based on final 5 laps. Data was obtained using L/V measurements modules as described herein.

FIG. 6B, shows the measurement of average lateral force measured by a data communication module of the present invention at a lateral/vertical force measurement location. Low rates of application of a friction control media to a track, which in this example corresponds to less than 1.4 of the normalized application rate, results in an average lateral force of 10.5 to 13 kips. After a threshold amount of friction control media is applied to the track (in this example greater than 1.4 normalized application rate), the average lateral force decreases about 20-50%, or to about 6 to 7.5 kips. These data were obtained using a closed loop rail system (American Association of Railroads Transportation Technology Center; TTCI). FIG. 6C, shows the measurement of L/V ratio measured by a data communication module of the present invention (using the TTCI track) at a lateral/vertical force measurement location. Low rates of application of a friction control media to a track, which in this example corresponds to less than 1.4 of the normalized application rate, results in an L/V ration of about 0.375 to 0.45. After a threshold amount of friction control media is applied to the track (in this example, greater than 1.4 normalized application rate), the average L/V ratio decreases about 20-50%, or to about 0.22 to about 0.3.

Therefore, by measuring data obtained at one or more lateral/vertical force measurement location, a change in a measured parameter, for example but not limited to an average lateral force, or an L/V ratio, may be used to change a setting transmitted to the one or more wayside device to increase friction control media application to a track. For example, which is not to be considered limiting, an increase in the average lateral force, or L/V ratio above a preset value, or an increase in the average lateral force, or L/V ratio over time of greater than 20%, for example but not limited to from about 20 to about 100%, or any amount therebetween, or from about 20 to 50%, or any amount therebetween, for example, from 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100%, or any amount therebetween, may be used to change a setting transmitted to the one or more wayside device to increase friction control media application to a track If there is no observed change of an L/V ratio, or an average lateral force measurement at the lateral/vertical force measurement location, when compared to a predetermined threshold value, or over a period of time, at the lateral/vertical force measurement location, then no change to a setting of friction control media application is transmitted to the one or more wayside device.

Referring to FIGS. 1A and 1B, initial settings 10 are applied to the friction management application systems 20 based on best practices and/or standards. Settings in the friction management application systems are typically comprised of a pump activation time and a frequency of application, expressed in wheel passes per activation.

The friction management application systems apply friction control media into the wheel/rail interface, providing the means to control friction between the wheel and rail surfaces 30. This is typically done using a motor pump 28 to dispense the friction control media through a series of feed hoses 21 and eventually a delivery system 24, which may include a set of applicator bars, or a spray device mounted to the rails, or the hoses may dispense the friction control media to track through holes within the track. For example, if the delivery device involves one or more applicator bars, they are used to introduce a flow of liquid media onto the rail surface or gauge face of the rail, where the friction control media is picked up and carried by passing wheel surfaces. Similarly, if the delivery device is a spray device, then the liquid media is directed to the rail surface or gauge face surface of the rail, and the friction control media is picked up and carried by passing wheel surfaces.

Figure 2:
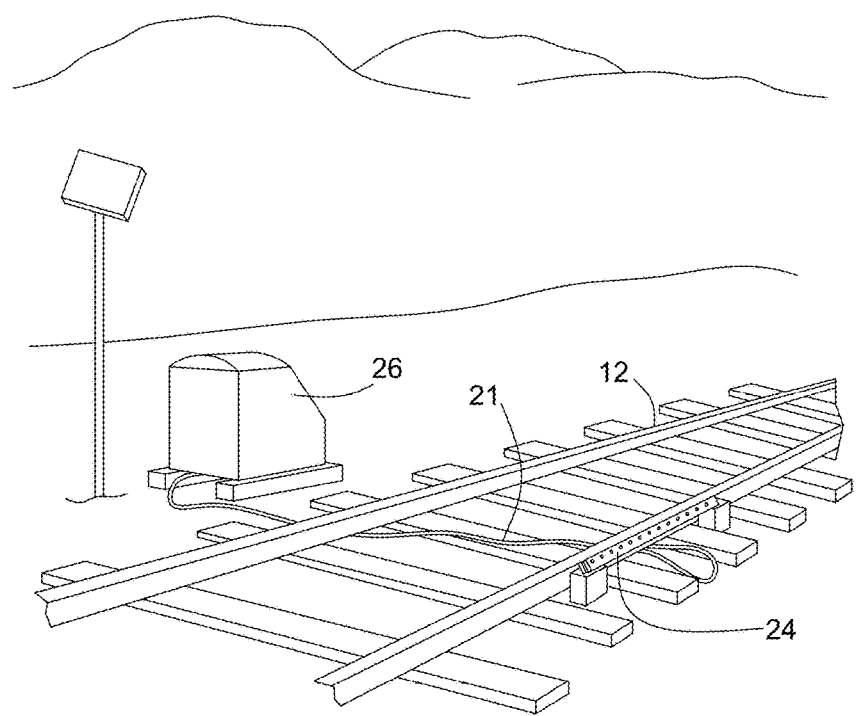
FIG. 2 shows an example of a typical friction management application system. In this example, the friction management application system comprises one wayside device (22) alongside a track (12). The wayside device comprises a delivery system (24), a reservoir containing the friction control media, and pump (28) located within a housing (generally shown as 26), and hoses (21) in fluid communication with the reservoir and the delivery system. The delivery system (24) in this example applies the friction control media to the top of rail surface through field mounted applicator bars.

FIG. 2 shows a non-limiting example of a wayside friction management application system, with a friction modifier consumable applied to the top of rail surface through field mounted applicator bars 24, in fluid communication via hoses 21 with a friction control media reservoir 26.

Figure 3:
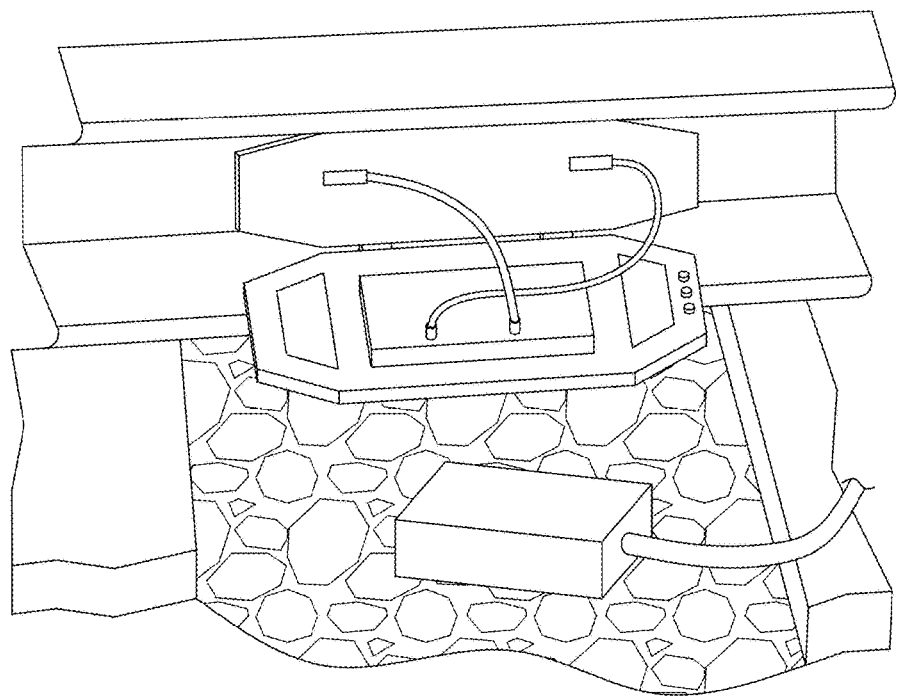
FIG. 3 shows the installation of rail mounted strain gages, comprising a lateral/vertical force measurement module. Also shown are the internal components of the protective cover, including power supply (battery) and RF radio for transmission of data.
Figure 4:
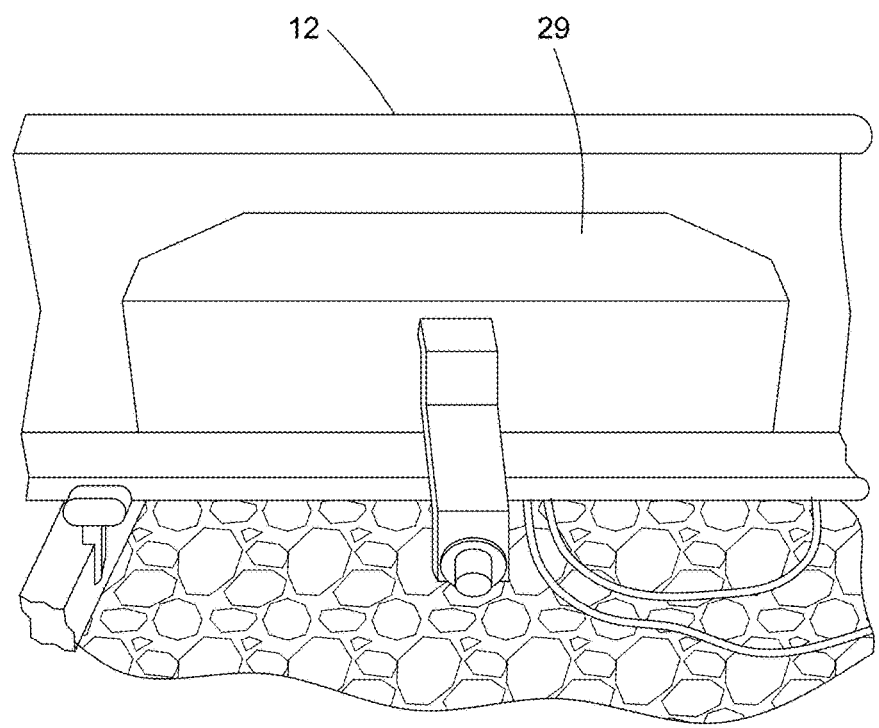
FIG. 4 and FIG. 5 show data communication modules comprising one or more L/V measurement modules, one or more strain gauges, batteries, temperature gauge, accelerometer, with protective covers (29) installed on a track (12).

FIG. 3 shows a lateral/vertical force measurement module a power supply (battery), and RF radio for transmission of data, are located as internal components within the protective cover 29. The device 29 with protective cover as installed on a track 12 is shown in FIGS. 4 and 5.

Figure 7:
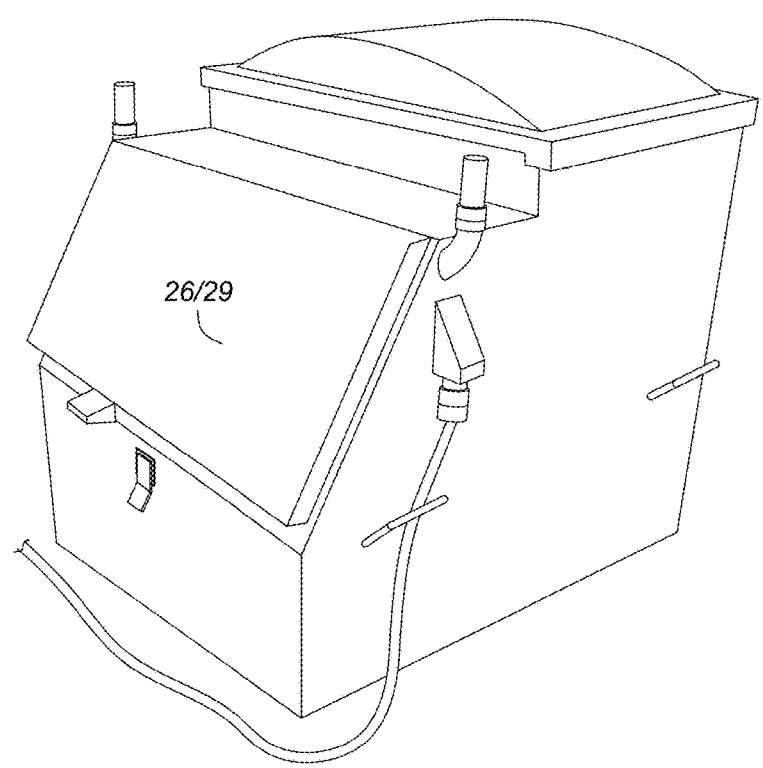
FIG. 7 shows a portion of the wayside friction management application system of the present invention comprising a friction control media reservoir (26) and radio frequency antennae for transmission of system status and performance data (29).

FIG. 7 shows an example of a wayside friction management application system with radio frequency antennae for transmission of system status and performance data to a remote site. FIG. 9 shows a schematic of data being transmitted from a data communication module via a remote control module (RCM) 26/29 to a remote performance monitoring database or data processing unit 27, via a communication (GPRS) tower 92.

Figure 5:
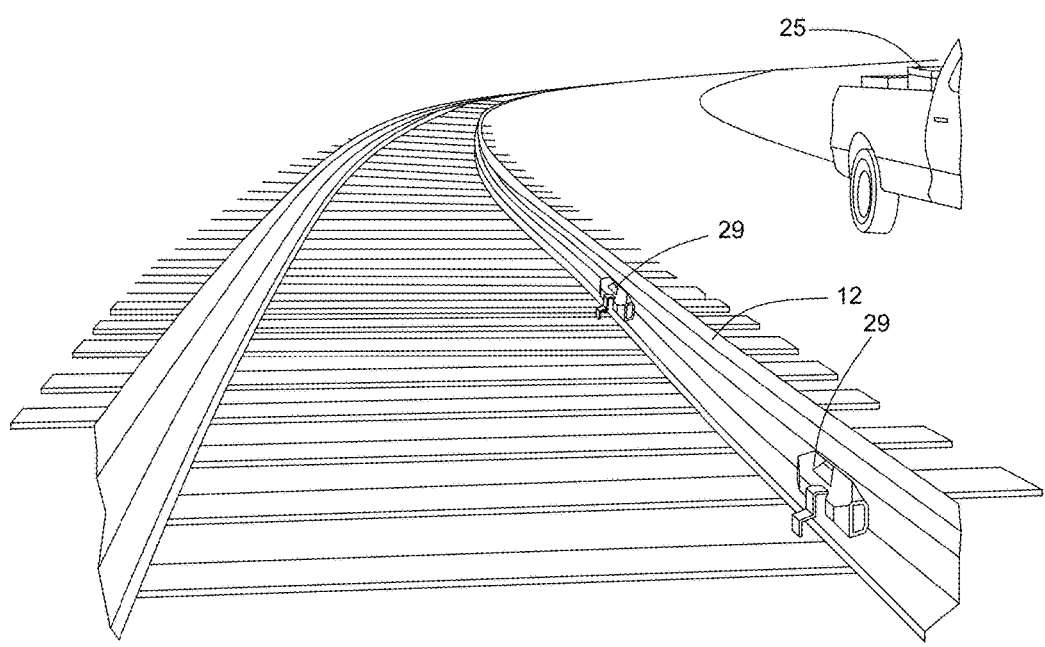
Figure 8:
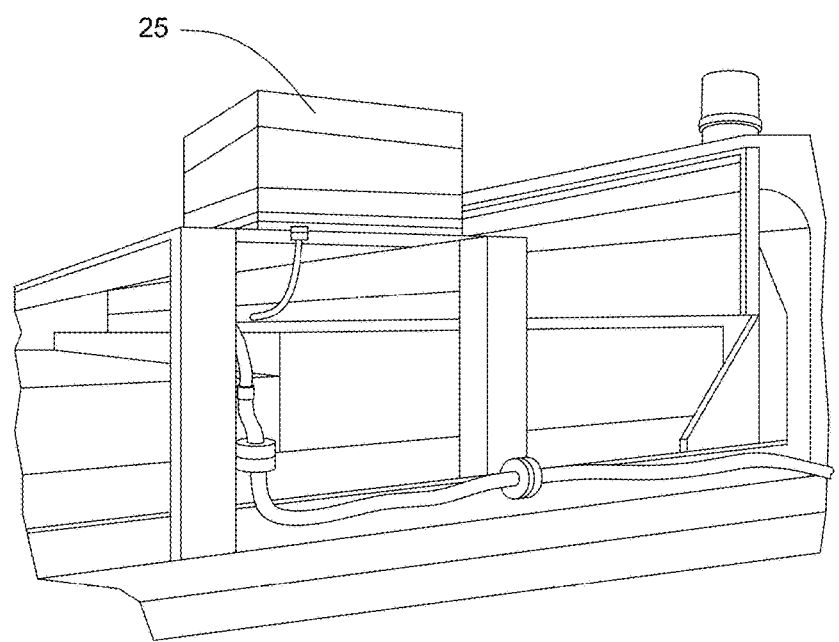
FIG. 8 shows a truck-mounted remote performance monitoring interrogator system (25), which collects data from wayside friction management application systems (see FIGS. 1A and 1B) and lateral/vertical force measurement sites, for subsequent transmission to a remote performance monitoring database (70).

Also contemplated by the present invention is wayside friction management system 1 further comprising a mobile remote performance monitoring interrogator system 25 (see FIGS. 5, 8 and 10). The mobile remote performance monitoring interrogator system 25 may for example be mounted on a truck (FIGS. 5 and 8), or other mobile platform. The mobile interrogator system collects data from one or more data communication modules 29 associated with a friction management application system 20 at a lateral/vertical force measurement sites as described herein, and transmits the data from a remote control module (RCM) 26/29 comprising a data communication module, via a transmission tower 92, to a remote performance monitoring database, or data processing unit 27. The mobile, or truck mounted interrogator provides the flexibility and capability of assessing a variety of specified lateral/vertical force measurement sites as desired.

The wheel/rail interface friction conditions 30 act in conjunction with other parameters such as wheel/rail profiles, track geometry and vehicle suspension characteristics to produce aggregate vehicle steering performance and corresponding force levels 40 (including lateral curving forces exerted on the rails). Minimizing these lateral force levels is one of the functions of effective friction management.

Self contained lateral and vertical force measurement modules, sensors, and other measurement devices as described above, are deployed in a geographical territory, recording lateral/vertical forces and other data parameters, in key locations 50. As noted above, several other performance measures can be used in addition to, or as alternatives to, lateral/vertical force measurement. Lateral/vertical force data is transmitted through Radio Frequency and/or Cellular communications channels and collected centrally in the Remote Performance Monitoring Database 70. The Remote Performance Monitoring System 70 may also maintain an archive of data 10 for example, lateral force-data, including reference values during baseline conditions (i.e. friction control not applied). The Remote Performance Monitoring system 70 analyzes incoming force data from lateral/vertical force measurement modules 50 and compares the values of lateral forces and lateral/vertical force ratios with baseline reference values, as well as recent values from the corresponding sites. In addition, vertical load and locomotive position data are used to identify and categorize train types and loaded/empty status to ensure that comparisons are made between like-traffic. If available, Automatic Equipment Identification data is further used to identify specific traffic types (e.g. specific commodities, manifest freight) by codes. Speed data may also analyzed, with filtering used to exclude data from trains operating at speeds significantly below or above the normal distribution of speeds at each measurement location.

The result of lateral/vertical force measurement analysis can result in the potential for an automatic adjustment 80 to application rates, specifically if (a) the data from one or more measurement sites is significantly higher than baseline reference conditions or (b) the data from one or more measurement sites shows a significant change in average values/force distributions versus recent data. In these cases the data is also evaluated with respect to known territory/maintenance conditions 60, which are reported to the remote performance monitoring system by project management and maintenance personnel.

Having evaluated the lateral/vertical force data in comparison to reference and recent values, as well as comparing with known maintenance conditions 60 (e.g. intentional system shut-down conditions due to known track maintenance work), the remote performance monitoring system 70 can use a high level decision making approach to determine whether an automatic adjustment of applicator systems is needed to reach or restore target lateral force levels. For example, if lateral forces (or lateral/vertical force ratios) show a significant increase in specific locations within a territory, it may be necessary to increase the output rates of corresponding friction management application systems 20 to restore target levels.

The remote performance monitoring system also receives status and performance data 90 from the wayside device, so that levels of friction control media, hose pressure and temperature, battery levels may also be tracked and considered when data for lateral forces (or lateral/vertical force ratios) show significant increase in specific locations within a territory, as it may be necessary to replenish remote friction management systems 20 in addition to increasing output rates of friction control media to restore target levels.

Automatic changes in friction control system application settings are transmitted by the remote performance monitoring system to the friction management application systems through Radio Frequency and/or Cellular communication channels.

The wayside friction management system described herein may use liquid or paste-like friction control media. Any liquid composition that can be pumped from the reservoir to a nozzle may be applied using the system of the present invention as would be readily determined by one of skill in the art. Non-limiting examples of liquid compositions that may be applied include but are not limited to those described in U.S. Pat. Nos. 6,135,767; 6,387,854; 5,492,642; US 2004 0038 831 A1; WO 02/26919 (US 2003 0 195 123 A1); WO 98/13445; CA 2,321,507; EP 1 357 175; EP 1 418 222; U.S. Pat. Nos. 6,795,372; 7,244,695; 7,357,427 (which are incorporated herein by reference).

All citations are hereby incorporated by reference.

The present invention has been described with regard to one or more embodiments the scope of the claims should not be limited by the preferred embodiments set forth in the examples, but should be given the broadest interpretation consistent with the description as a whole.

What is claimed is:

1. A method of monitoring a wayside friction management system comprising, collecting data measured at one or more data collection module located at a lateral/vertical force measurement location, transmitting the data by radio frequency, cellular communications channels, or both, from the data collection module to a remote performance unit, and comparing the data with base line reference values stored on a database of the remote performance unit, the base line reference values comprising track maintenance conditions and known lateral force measurement patterns correlated with known maintenance conditions.

2. The method of claim 1, wherein the data measured at each of the one or more lateral/vertical force measurement location pertains to performance information of the track, information of the train, status information of the track, an environment of the track, a measurement of lateral/vertical force, incoming vertical load, locomotive position, temperature, precipitation, wind, vibration, train speed, a video, a photograph, a sound recording, automatic equipment identification, reservoir tank level, pump motor current, delivery line pressure, delivery line temperature, battery voltage, or a combination thereof.

3. The method of claim 2, wherein the data measured includes incoming vertical load and locomotive position data, analyzing the data to identify and categorize train type, loaded/empty status of the train to ensure that the data compared is obtained from like-traffic.

4. The method of claim 2, wherein the data measured is automatic equipment identification (AEI) data, comparing the AEI data with the lateral/vertical force records stored in the remote performance database to produce results, and using the results to identify specific traffic types by code.

5. The method of claim 4, wherein the data measured is speed data, filtering the data to exclude data from trains operating at speeds significantly below or above the normal distribution of speeds at each lateral/vertical force measurement location.

6. The method of claim 1, wherein the wayside friction management system comprises one or more wayside device, the data measured from one or more data collection module is compared with the base line reference values stored on a database of the remote performance unit, the base line reference values comprising track maintenance condition, intentional system shutdown conditions due to known track maintenance work, track grinding, tie removal, tie replacement, or a combination thereof, to determine whether an adjustment of a delivery system of the one or more wayside device is needed to restore target lateral force levels.

7. The method of claim 6, wherein changes in friction control system application settings are transmitted to the one or more wayside device.

8. The method of claim 7, wherein an increase in a lateral/vertical force ratio, or an average lateral axel force measurement obtained at the lateral/vertical force measurement location, when compared to a value predetermined at the lateral/vertical force measurement location, results in a change of a setting transmitted to the one or more wayside device to increase friction control media application to a track.

9. The method of claim 7, wherein no change of a lateral/vertical force ratio, or an average lateral axel force measurement obtained at the lateral/vertical force measurement location, when compared to a threshold value predetermined at the lateral/vertical force measurement location, results in no change to a setting of friction control media application transmitted to the one or more wayside device.

10. The method of claim 1, wherein the base line reference values further comprise recent values obtained from the lateral/vertical force measurement location stored on the database of the remote performance monitoring unit.

* * * * *